United States Patent

Heinemann et al.

[11] Patent Number: 5,854,358
[45] Date of Patent: Dec. 29, 1998

[54] POLYMERIZING MONOMERS IN PRESENCE OF POLYOL AND CASTOR OIL-POLYOL PRODUCT

[75] Inventors: Torsten Heinemann; Hans-Joachim Scholl, both of Köln; Manfred Dietrich, Leverkusen; Gundolf Jacobs, Rösrath; Mark Kratz, Krefeld; Josef Sanders, Leverkusen; Helmut Woynar, Dormagen, all of Germany

[73] Assignee: Bayer Aktiengesellschaft, Leverkusen, Germany

[21] Appl. No.: 682,063

[22] Filed: Jul. 16, 1996

[30] Foreign Application Priority Data

Jul. 24, 1995 [DE] Germany ................. 195 26 921.7

[51] Int. Cl.$^6$ .................. C08G 18/04; C08G 63/06; C08G 65/48
[52] U.S. Cl. .................. 525/404; 521/173; 528/361
[58] Field of Search .................. 525/63, 404; 521/173; 528/361

[56] References Cited

U.S. PATENT DOCUMENTS

| | | | |
|---|---|---|---|
| 3,304,273 | 2/1967 | Stamberger | 260/2.5 |
| 3,383,351 | 5/1968 | Stamberger | 260/33.2 |
| 3,652,639 | 3/1972 | Pizzini et al. | 260/465.4 |
| 3,823,201 | 7/1974 | Pizzini et al. | 260/861 |
| 3,936,409 | 2/1976 | Schroeder et al. | 528/80 |
| 4,158,672 | 6/1979 | Dear et al. | 528/70 |
| 4,342,840 | 8/1982 | Kozawa et al. | 521/137 |
| 4,390,645 | 6/1983 | Hoffman et al. | 521/137 |
| 4,460,715 | 7/1984 | Hoffman et al. | 521/137 |
| 4,568,705 | 2/1986 | Grace et al. | 521/137 |
| 4,603,188 | 7/1986 | Kusakawa et al. | 528/60 |
| 4,661,531 | 4/1987 | Davis et al. | 521/137 |
| 5,093,412 | 3/1992 | Mente et al. | 524/762 |
| 5,272,204 | 12/1993 | Akimoto et al. | 524/773 |
| 5,594,066 | 1/1997 | Heinemann et al. | 524/761 |
| 5,621,043 | 4/1997 | Croft | 528/73 |

FOREIGN PATENT DOCUMENTS

| | | |
|---|---|---|
| 1152536 | 8/1963 | Germany . |
| 1152537 | 8/1963 | Germany . |
| 57-200415 | 12/1982 | Japan . |

*Primary Examiner*—Robert E. Sellers
*Attorney, Agent, or Firm*—Joseph C. Gil; N. Denise Brown

[57] ABSTRACT

A process is described for the preparation of stable, agglomerate-free, low-viscosity graft copolymer dispersions by the free-radical polymerization of olefinic monomers, such as styrene and/or acrylonitrile, with polyol compounds in the presence of a hydroxyl compound modified with castor oil. The use of these graft copolymer dispersions in the manufacture of polyurethane plastics, particularly flexible foams, by the isocyanate polyaddition process is also described.

10 Claims, No Drawings

POLYMERIZING MONOMERS IN PRESENCE OF POLYOL AND CASTOR OIL-POLYOL PRODUCT

The present invention relates to the preparation of low-viscosity polymeric polyols and to their use in the manufacture of polyurethane foams.

Polymeric polyols are understood as meaning products which can be obtained by the polymerization of olefinic monomers with polyetherpolyols ("basic polyols"). The olefinic monomers used here are mainly ethylenically unsaturated compounds such as e.g. styrene or acrylonitrile.

Polymeric polyols are used in the manufacture of flexible polyurethane foams.

The preparation of polymeric polyols is described, for example, in U.S. Pat. Nos. 3,383,351 and 3,304,273, and in DE-A 1,152,536 and DE-A 1,152,537.

In the ideal case, the polymeric polyols are relatively low-viscosity, fine, non-sedimenting dispersions of the polymer (preferably an acrylonitrile/styrene graft copolymer) in the essentially unmodified polyetherpolyol. Characterizing features for the quality and processability of the polymeric polyols are viscosity, storage stability (stability against sedimentation) and fineness (particle size). These properties are influenced principally by the type and proportions of the starting materials. The quality of the product is greatly affected particularly by the solids content (proportion of monomers in the mixture) and the ratio of monomers to each other (e.g. styrene/acrylonitrile ratio).

The most important considerations in the preparation of polymeric polyols are to achieve high solids contents (at least 40%) with the lowest possible viscosity and at the same time excellent product stability. To achieve product stability, i.e. prevention of the formation of undesirable agglomerated polymer particles precipitating from the continuous phase (the basic polyol), the polymer particles must be stabilized during the preparation of the polymeric polyol. This stabilization can be effected by incorporating some of the molecules of the basic polyether into the polymer formed in situ, the efficacy of the stabilization being favored for example, by the highest possible molecular weight of the basic polyether and by the highest possible proportion of acrylonitrile in the monomer mixture. While a high acrylonitrile content increases the inherent color of the polymeric polyols and increases the tendency of flexible foams manufactured therewith to discolor, and hence is undesirable, the viscosity of the polymeric polyols is increased by the use of basic polyols of higher molecular weight.

Another possible way of stabilizing polymeric polyols, according to the state of the art, is the concomitant use of compounds compatible with the polyol phase and containing ethylenically unsaturated, polymerizable groups. These so-called macromonomers (macromers) copolymerize with the vinyl monomers, so the resulting polymer particles are sterically stabilized by polyether side-chains and are thereby protected from agglomeration and sedimentation.

The preparation of polymeric polyols with the concomitant use of macromonomers is described e.g. in U.S. Pat. Nos. 3,652,639, 3,823,201, 4,460,715, 4,390,645, 5,093,412 and 4,342,840. The ethylenically unsaturated double bonds are introduced into polyetherpolyols, for example, by reaction with cyclic unsaturated carboxylic anhydrides such as maleic anhydride, and subsequent reaction with ethylene oxide or propylene oxide, by esterification with acrylic or methacrylic acid (or derivatives thereof), by reaction with allyl glycidyl ether or by reaction with an unsaturated isocyanate such as e.g. an isocyanatoalkyl acrylate or methacrylate, 1-(1-isocyanato-1-methylethyl)-3-(1-methylethenyl)benzene or NCO-functional adducts of a polyisocyanate and hydroxyethyl or hydroxypropyl acrylate.

There exists a need for polymeric polyols which have a low viscosity with the highest possible solids content.

It has now been found that low-viscosity, stable polymeric polyols can be obtained if they are prepared using hydroxyl compounds modified with castor oil.

SUMMARY OF THE INVENTION

The present invention provides a process for the preparation of stable, low-viscosity graft copolymer dispersions by the free-radical polymerization of a reaction mixture which comprises one or more olefinic monomers, one or more basic polyols, and one or more hydroxyl compounds modified with castor oil in the presence of a free-radical catalyst.

The present invention also provides stable, low viscosity graft copolymer dispersions produced by the above process, and a process of producing polyurethanes plastics, preferably polyurethane foams, by the isocyanate addition process.

Conventionally, the olefinic monomers are used here in an amount of 20 to 65wt. %, based on the end product.

The polymerization can optionally be carried out in the presence of a low-molecular regulator and, optionally, in an organic solvent.

According to the invention, it is preferred that:
1) the olefinic monomers used are ethylenically unsaturated monomers, particularly styrene and/or acrylonitrile,
2) the ethylenically unsaturated monomers used are mixtures of styrene and acrylonitrile in a weight ratio of 20:80 to 80:20, preferably of 25:75 to 75:25,
3) the basic polyol used is a polyol having at least two hydroxyl groups, most preferably a polyetherpolyol with a functionality of 2.5 to 6 and an OH number of up to 100,
4) the hydroxyl compounds modified with castor oil have molecular weights of 6000 to 100,000 g/mol and a functionality of 2 to 6, and 5) the modified polyols used are reaction products which have been prepared with castor oil and hydroxyl compounds in a molar ratio of 1.1:1 to 10:1 (castor oil to hydroxyl compound), most preferably 1.1:1 to 3:1.

The polyols used as "basic polyols" and having at least two hydroxyl groups are preferably polyether polyols. Suitable polyether polyols are, for example, the addition products, which are known per se, of cyclic ethers such as ethylene oxide, propylene oxide, styrene oxide or butylene oxide, and starter compounds such as, for example, polyhydroxyl compounds such as alkylene glycols, glycerol, trimethylolpropane, pentaerythritol or sorbitol, or amines like ethylenediamine or toluylenediamines. The polyetherpolyols used as "basic polyols" preferably have functionalities of 2.5 to 6 and an OH number of about 20 to 100. The polyether chains are made up of propylene oxide and ethylene oxide units. In principle, however, polyester polyols having functionalities of preferably from about 2.5 to 6 and an OH number of about 20 to 100 are also suitable as "basic polyols".

The polymeric polyols are obtained by the free-radical polymerization of an olefinically unsaturated monomer or a mixture of olefinically unsaturated monomers in the polyether polyols described. Examples of such monomers include butadiene, styrene, α-methyl-styrene, methylstyrene, ethylstyrene, acrylonitrile, methacrylonitrile, methyl methacrylate and acrylic acid esters. It is preferable to use styrene and acrylonitrile. The amount of olefinically unsaturated monomers is 20 to 65 wt. %, based on the total amount of finished product. When using styrene and acrylonitrile, the ratio of these two monomers is preferably 20:80 to 80:20 and especially 70:30 to 30:70 parts by weight.

The free-radical polymerization is initiated with conventional radical-forming initiators. Some examples of such initiators include organic peroxides such as, for example, benzoyl peroxide, tert-butyl octoate or didecanoyl peroxide, and azo compounds such as, for example, azoisobutyronitrile or 2,2'-azobis(2-methylbutyronitrile).

The hydroxyl compounds modified with castor oil are preferably also polyols, and preferably polyether polyols. Suitable compounds include, for example, the addition products, known per se, of cyclic ethers such as ethylene oxide, propylene oxide, styrene oxide or butylene oxide, and starter compounds such as e.g. polyhydroxyl compounds like alkylene glycols, glycerol, trimethylolpropane, pentaerythritol or sorbitol, or amines like ethylenediamine or toluylenediamines. The polyether chains are preferably made up of propylene oxide and ethylene oxide units. The functionalities of the hydroxyl compounds modified with castor oil is preferably between about 2 and 6, and the molecular weights are preferably between about 6000 and 100,000 g/mol, more preferably between about 6000 and 15,000 g/mol. Modified hydroxyl compounds which have proved particularly effective here are those prepared with the castor oil in molar excess relative to the polyetherpolyol used, preferably in an excess of 1.1:1 to 10:1 and more preferably 1.1:1 to 3:1.

Low-molecular regulators which can optionally be added are especially alcohols such as, for example, methanol, ethanol, isopropanol, butanols or butanediol, mercaptans, allyl compounds, and enol ethers such as, for example, (cyclohex-3-enylidenemethoxymethyl)benzene.

Solvents which can optionally be used in the present invention include, for example, hydrocarbons such as, for example, toluene, ethylbenzene, isopropylbenzene or xylenes, or ketones such as, for example, acetone or methyl ethyl ketone. It is preferable to use toluene and/or ethylbenzene.

The process according to the invention can be carried out either batchwise or continuously. For example, a mixture containing the ethylenically unsaturated monomers, the initiator, optionally, solvents and, optionally, part of the polyether to be used can be metered into the reactor equipped with a stirrer and containing the preheated polyether, the hydroxyl compound modified with castor oil and, optionally, the regulator. However, a further possibility is to meter in the regulator and part of the hydroxyl compound modified with castor oil.

Yet another possibility is to meter a mixture of all the reactants continuously into a reactor and withdraw the product proportionately through an overflow.

The temperature at which the polymerization is carried out is normally from about 80° to 140° C., preferably 90° to 130° C.

When the polymerization reaction has ended, readily volatile components, such as residual monomers, solvents and regulator residues, are removed from the product in conventional manner by vacuum distillation.

The polymeric polyols prepared by the process according to the invention are outstandingly suitable for the manufacture of polyurethane plastics by the isocyanate polyaddition process. They are free of any kind of polymer agglomerates, are stable and have a low viscosity.

The invention also provides a process for the preparation of the hydroxyl compounds modified with castor oil. These can be prepared, for example, by reacting the aforementioned polyetherpolyols with castor oil in a molar ratio of 0.1:1 to 10:1. It is particularly preferred to use the castor oil in excess as this surprisingly gives particularly active modified hydroxyl compounds. The molar ratio of castor oil to hydroxyl compound should be from about 1.1:1 to 10:1, preferably 1.1:1 to 3:1. The temperature during this reaction is generally from about 100° to 280° C., preferably from about 150° to 250° C. The reaction can be accelerated by adding catalysts such as, for example, Ca(OH)$_2$, dibutyltin dilaurate, tin dichloride or titanium tetrabutylate. The molecular weights of the modified hydroxyl compounds can optionally be increased by adding one or more carboxylic acids which are at least difunctional, or one or more carboxylic acid derivatives during the modification reaction to give molecular weights of 7000 to 100,000 g/mol.

The invention further relates to stable, low-viscosity graft copolymer dispersions produced by the process according to the invention, and to the use of the graft copolymer dispersions produced by the process of the invention as polyol components in the manufacture of polyurethane plastics by the isocyanate polyaddition process.

Polyurethane plastics, preferably flexible polyurethane foams, are manufactured by reacting a) organic polyisocyanates, with b) the polymeric polyols produced by the process of the present invention, optionally, in the presence of c) other higher-molecular and/or low-molecular compounds containing hydrogen atoms reactive towards isocyanates, d) catalysts, e) water and/or low-boiling hydrocarbons as blowing agents, and f) auxiliary substances and/or additives.

The following are used as starting components:

a) aliphatic, cycloaliphatic, araliphatic, aromatic and heterocyclic polyisocyanates such as those described e.g. by W. Siefgen in Justus Liebigs Annalen der Chemie, 362, pages 75 to 136, for example those of the general formula

wherein n is 2 to 5, preferably 2 to 3, and

Q is an aliphatic hydrocarbon radical having 2 to 18, preferably 6 to 10 carbon atoms, a cycloaliphatic hydrocarbon radical having 4 to 15, preferably 5 to 10 carbon atoms, or an aromatic hydrocarbon radical having 6 to 15, preferably 6 to 13 carbon atoms, e.g. polyisocyanates such as those described in DE-OS 2,832,253, pages 10 to 11.

It is normally particularly preferable to use the polyisocyanates which are readily available industrially such as, for example, 2,4- and 2,6-toluylene diisocyanate, and any mixtures of these isomers ("TDI"), diphenyl-methane diisocyanate ("MDI"), polyphenylpolymethylene polyisocyanates such as those prepared by aniline/formaldehyde condensation and subsequent phosgenation, and polyisocyanates containing carbodiimide groups, urethane groups, allophanate groups, isocyanurate groups, urea groups or biuret groups ("modified polyisocyanates"), especially modified polyisocyanates derived from 2,4- and/or 2,6-toluylene diisocyanate or 4,4'- and/or 2,4'-diphenylmethane diisocyanate;

Suitable components b) for producing plastics, and preferably flexible foams are the polymeric polyols produced by the process of this invention.

Suitable components c) isocyanate-reactive compounds to be optionally used in the process for producing plastics, and preferably flexible foams, include compounds having at least 2 hydrogen atoms reactive towards isocyanates and a molecular weight of 40 to 10,000 g/mol. Preferably these compounds are polyetherpolyols, such as, the addition products, known per se, of cyclic ethers such as ethylene oxide, propylene oxide, styrene oxide or butylene oxide, and starter compounds such as, for example, polyhydroxyl compounds like alkylene glycols, glycerol, trimethylolpropane, pentaerythritol or sorbitol, or amines like ethylenediamine or toluylenediamines, as well as the starter compounds themselves.

Suitable components d) catalysts to be optionally used in the process for producing plastics, and preferably flexible foams, include the catalysts conventionally employed per se in polyurethane chemistry.

Also suitable for the process of producing plastics, preferably flexible foams are e) water and/or low-boiling hydrocarbons are optionally used concomitantly as blowing agents. Some examples of these blowing agents include, for example, low-boiling alkanes such as pentane, cycloalkanes such as cyclopentane, alkenes, and gases, such as carbon dioxide, may be incorporated into the reaction mixture under pressure.

It is also possible to include f1) auxiliary substances and additives, such as surface-active additives like emulsifiers, and foam stabilizers, as optionally components, and f2) reaction retarders, cell regulators of the type known per se, such as paraffins, fatty alcohols or dimethyl-polysiloxanes, pigments or dyestuffs, flameproofing agents of the type known per se, stabilizers to combat the effects of ageing and weathering, plasticizers and substances with a fungistatic and bacteriostatic action.

Examples of surface-active additives and foam stabilizers which are optionally to be used concomitantly according to the invention, reaction retarders, stabilizers, flameproofing substances, plasticizers, dyestuffs and substances with a fungistatic and bacteriostatic action, as well as details about the mode of use and mode of action of these additives, are described in Kunststoff-Handbuch (Plastics Handbook), volume VII, edited by G. Oertel, Carl Hanser Verlag, Munich, 1993, e.g. on pages 104 to 127.

The flexible polyurethane foams are manufactured in a manner known per se, e.g. as described in Kunststoff-Handbuch (Plastics Handbook), volume VII, edited by G. Oertel, Carl Hanser Verlag, Munich, 1993, e.g. on pages 139 to 263.

As used herein, the phrase molecular weight refers to the number average molecular weight.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

The following starting materials were used in the working examples:

Polyol A: polypropylene oxide/ethylene oxide ether of molecular weight 12,020 g/mol, based on sorbitol Polyol B: polypropylene oxide/ethylene oxide ether of molecular weight 6000 g/mol, based on trimethylolpropane Polyol C: polypropylene oxide/ethylene oxide ether of molecular weight 3000 g/mol, based on glycerol

Example 1

Preparation of a hydroxyl compound according to the invention, modified with castor oil (polyol D):

1000 g of polyol A, 60 g of castor oil and 1 g of dibutyltin dilaurate were mixed and stirred for 4 hours at 240° C. A clear yellow liquid was obtained after cooling.

Example 2

Preparation of a hydroxyl compound according to the invention, modified with castor oil (polyol E):

900 g of polyol A, 108 g of castor oil and 1 g of dibutyltin dilaurate were mixed and stirred for 4 hours at 240° C. A clear yellow liquid was obtained after cooling.

Example 3

Preparation of a hydroxyl compound according to the invention, modified with castor oil (polyol F):

480 g of polyol B, 60 g of castor oil and 1 g of dibutyltin dilaurate were mixed and stirred for 4 hours at 240° C. A clear yellow liquid was obtained after cooling.

Example 4

Preparation of a hydroxyl compound according to the invention, modified with castor oil, the molecular weight was increased by additional polycondensation (polyol G):

900 g of polyol A, 108 g of castor oil, 40 g of a dimeric fatty acid (Pripol 1025 from Unichema) and 1 g of dibutyltin dilaurate were mixed and stirred for 5 hours at 240° C. A clear yellow liquid was obtained after cooling; calculated molecular weight: 9000 g/mol.

Example 5

Preparation of a hydroxyl compound according to the invention, modified with castor oil, the molecular weight was increased by additional polycondensation (polyol H):

160 g of polyol A, 20 g of castor oil, 17 g of a dimeric fatty acid (Pripol 1025 from Unichema) and 1 g of dibutyltin dilaurate were mixed and stirred for 5 hours at 240° C. A high-viscosity, clear orange-coloured liquid was obtained after cooling; calculated molecular weight: 30,000 g/mol.

Example 6

Preparation of a polymeric polyol by the process according to the invention:

238 g of styrene, 158 g of acrylonitrile, 324 g polyol C and 4,5 g of 2,2'-azobis2-methylbutyronitrile) were metered into 162 g of polyol C, 54 g of polyol D and 25 g of isopropanol over 2 hours at 125° C., with stirring. After 10 more minutes, 0.4 g of 2,2'-azobis(2-methylbutyronitrile) in 19 g of isopropanol was then added to complete the reaction. After a post-reaction time of 1 hour, residual monomers, regulator residues and solvents were removed by vacuum distillation; the product was filtered through a filter cloth with a mesh width of 100 $\mu$m. The product was a white, agglomerate-free dispersion having a viscosity of 5000 mPa.s/25° C. and a solids content of 40 wt. %.

Examples 7 to 15

Examples 7 to 15 illustrate the preparation of polymeric polyols by the process according to the invention; the procedure used corresponds to used in Example 6 and the amounts are in g.

Enol ether: (cyclohex-3-enylidenemethoxymethyl)benzene.

Polyethers modified with castor oil are used in Examples 7 to 10. Polyethers modified with castor oil, whose molecular weight was increased by the addition of a polybasic carboxylic acid, were used in Examples 11 to 14.

A mixture of polyethers modified with castor oil, of different molecular weights, was used in Example 15.

The following abbreviations are used in the table below:

ACN: acrylonitrile

IPA: isopropanol

Enol E: enol ether

| Example | 7 | 8 | 9 | 10 | 11 | 12 | 13 | 14 | 15 |
|---|---|---|---|---|---|---|---|---|---|
| Polyol C | 486 | 486 | 486 | 486 | 505 | 505 | 505 | 505 | 486 |
| Polyol E | 54 | 54 | 54 | 54 | | | | | |
| Polyol F | | | | | | | | | 44 |
| Polyol G | | | | | 35 | 35 | 35 | 35 | |
| Polyol H | | | | | | | | | 10 |
| Styrene | 216 | 216 | 216 | 216 | 216 | 216 | 216 | 216 | 216 |
| ACN | 144 | 144 | 144 | 144 | 144 | 144 | 144 | 144 | 144 |
| Toluene | | 135 | 120 | 135 | | 135 | 120 | 135 | |
| IPA | 25 | | 25 | | 30 | | 25 | | 25 |
| Enol E | | | | 8 | | | | 8 | |
| Viscosity (mPa · s @ 25° C.) | 4850 | 4010 | 3700 | 3500 | 5900 | 5500 | 3800 | 4000 | 5500 |

Examples 16 to 21

Use of the polymeric polyols according to the invention in the manufacture of polyurethane foams:

Examples 17, 18, 20 and 21 illustrate the suitability of the polymeric polyols prepared according to the invention for the manufacture of flexible foams, compared with a conventional polymeric polyol (Examples 16 and 19).

All the components—except for the polyisocyanate—were thoroughly mixed together. The polyisocyanate was then added, with stirring, and the reaction mixture was poured into an open mold, where it expanded to produce a flexible foam.

The following materials were used in the production of flexible foams:

Polyol I: polypropylene oxide/ethylene oxide ether of molecular weight 3700 g/mol, based on trimethylolpropane Polymeric polyol (standard): Desmophen 80WB40 (Bayer AG) having an OH-number of 19

Catalyst 1: mixture of dimethylethanolamine and bis-N, N-dimethylaminoethyl ether Catalyst 2: tin octoate Stabilizer: polyethersiloxane from Goldschmidt, Essen Isocyanate: toluylene diisocyanate containing 80% of the 2,4-isomer and 20% of the 2,6-isomer.

Foaming Examples (amounts in parts by weight)

| | Example | | |
|---|---|---|---|
| | 16 | 17 | 18 |
| Polyol I | 50 | 50 | 50 |
| Polymeric polyol (standard) | 50 | — | — |
| Polymeric polyol (Example 7) | — | 50 | — |
| Polymeric polyol (Example 15) | — | — | 50 |
| Water | 4.5 | 4.5 | 4.5 |
| Stabilizer | 1.0 | 1.0 | 1.0 |
| Catalyst 1 | 0.15 | 0.15 | 0.15 |
| Catalyst 2 | 0.16 | 0.16 | 0.14 |
| Isocyanate | 52.4 | 53.5 | 53.5 |
| Index | 108 | 108 | 108 |
| Gross density (kg/m$^3$) | 26 | 27 | 26 |
| Compressive hardness in kPa | 7.57 | 7.67 | 8.65 |

| | Example | | |
|---|---|---|---|
| | 19 | 20 | 21 |
| Polyol I | 75 | 75 | 75 |
| Polymeric polyol (standard) | 25 | — | — |
| Polymeric polyol (Example 7) | — | 25 | — |
| Polymeric polyol (Example 15) | — | — | 25 |
| Water | 4.5 | 4.5 | 4.5 |
| Stabilizer | 1.0 | 1.0 | 1.0 |
| Catalyst 1 | 0.15 | 0.15 | 0.15 |
| Catalyst 2 | 0.16 | 0.16 | 0.13 |
| Isocyanate | 53.4 | 54.5 | 54.5 |
| Index | 108 | 108 | 108 |
| Gross density (kg/m$^3$) | 27 | 26.5 | 26.4 |
| Compressive hardness in kPa | 6.95 | 6.51 | 6.06 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of stable, low-viscosity graft copolymer dispersions by the free-radical polymerization of a reaction mixture in the presence of a free-radical catalyst, wherein said reaction mixture comprises:
   1) at least one ethylenically unsaturated monomer,
   2) at least one base polyol having at least two hydroxyl groups,
   and
   3) at least one modified hydroxyl group containing compound which is prepared by reacting a) castor oil with b) a polyol in a molar ratio of 1.1:1 to 10:1.

2. The process of claim 1, wherein said reaction mixture additionally comprises one or more solvents.

3. The process of claim 1, wherein said ethylenically unsaturated monomer comprises a mixture of styrene and acrylonitrile.

4. The process of claim 3, wherein said mixture of styrene and acrylonitrile is present in a weight ratio of 20:80 to 80:20.

5. The process of claim 4, wherein said mixture of styrene and acrylonitrile is present in a weight ratio of 25:75 to 75:25.

6. The process of claim 1, wherein said base polyol comprises a polyetherpolyol having at least two hydroxyl groups, a functionality of 2.5 to 6 and an OH number of 20 to 100.

7. The process of claim 1, wherein said modified hydroxyl group containing compound has a molecular weight of 6000 to 100,000 g/mol and a functionality of 2 to 6.

8. The process of claim 7, wherein said modified hydroxyl group containing compound is prepared by reacting a) castor oil with b) a polyol in a molar ratio of 1.1:1 to 3:1.

9. A stable, low-viscosity graft copolymer dispersion produced by the process of claim 1.

10. The process of claim 1, wherein said reaction mixture additionally comprises one or more low molecular weight regulators.

* * * * *